Figure 1:
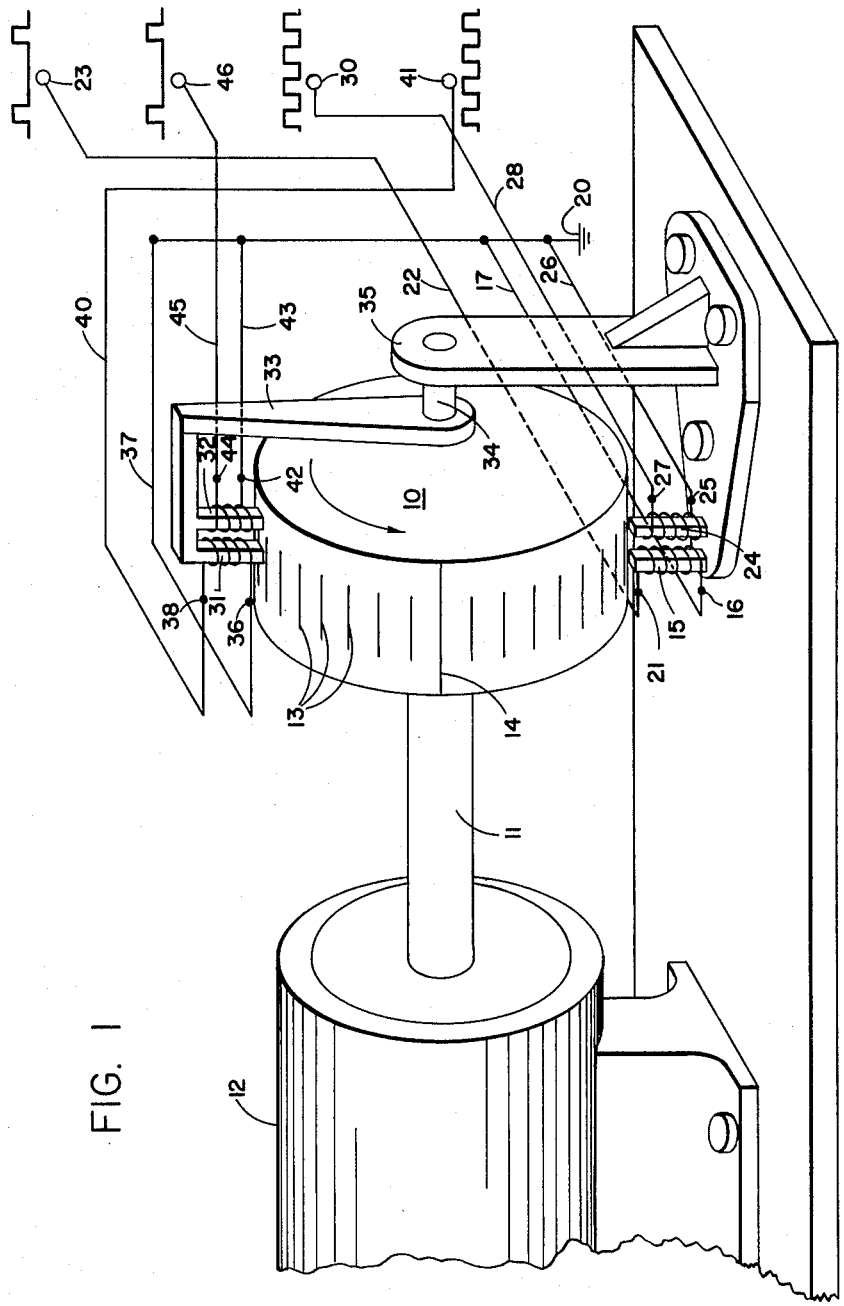

March 8, 1966 G. R. SPETZ 3,239,817
ANGLE OF ROTATION MEASURING APPARATUS
Filed Oct. 12, 1961 2 Sheets-Sheet 1

INVENTOR.
GLEN R. SPETZ
BY Roger W. Jensen

March 8, 1966 — G. R. SPETZ — 3,239,817
ANGLE OF ROTATION MEASURING APPARATUS
Filed Oct. 12, 1961 — 2 Sheets-Sheet 2

INVENTOR.
GLEN R. SPETZ
BY Roger W. Hensen
ATTORNEY

United States Patent Office 3,239,817
Patented Mar. 8, 1966

3,239,817
ANGLE OF ROTATION MEASURING
APPARATUS
Glen R. Spetz, Pinellas County, Fla., assignor to Honeywell Inc., a corporation of Delaware
Filed Oct. 12, 1961, Ser. No. 144,735
4 Claims. (Cl. 340—172.5)

This invention pertains to control apparatus and more particularly to digital angle encoders for accurately determining shaft rotation angles.

The invention comprises a magnetic drum rotatable about an axis, the drum having a plurality of magnetic lines, including one "long" line, upon its surface. Positioned adjacent to the surface of the drum are four magnetic pickup heads. Two of the pickup heads are fixed or stationary while the other two are coaxially mounted with the drum and are free to rotate relative to the surface of the drum.

The first stationary pickup and the first movable pickup are positioned so that they are activated only by the "long" magnetic line while the second stationary pickup and the second movable pickup are positioned so that they are activated by all of the magnetic lines.

The output of a pulse generator is fed through a gate circuit to a coarse-fine counter. The first and second stationary pickups are connected to the gate so that when these pickups are actuated the gate is opened and pulses are fed to the counter. The first and second movable pickups are connected to the gate so that the gate is closed or inhibited when these pickups are actuated.

When the "long" magnetic line passes under the first stationary pickup head the gate is opened and the pulses from the pulse generator are counted on the coarse-fine counter until the "long" magnetic line passes under the first movable pickup at which time the gate is closed. The pulse count counted by the coarse-fine counter is a measure of a condition or the angle between the stationary and movable pickup heads.

When the first movable pickup head was pulsed the output from this head clears the "fine" portion of the coarse-fine counter, energizes the second stationary and the second movable pickup and deenergizes the first stationary and the first movable pickup.

The next subsequent magnetic line pulses the second stationary pickup and the gate is again opened and the pulses from the pulse generator are counted on the "fine" counter, being added or subtracted on the "coarse" counter as required. The pulses being fed to the "fine" counter are stopped when a magnetic line pulses the second movable pickup head. The information from the coarse-fine counter is then shifted into the storage register. The cycle is repeated on the next subsequent pulsing of the second stationary pickup head.

It is one object of this invention to provide an improved digital angle encoder.

Another object of this invention is to provide a digital angle encoder having an improved frequency response.

A further object of this invention is to provide a digital angle encoder which utilizes a first pair of condition responsive devices to determine a particular condition, and which utilizes a second pair of condition responsive devices to incrementally correct the particular condition.

Figure 2:
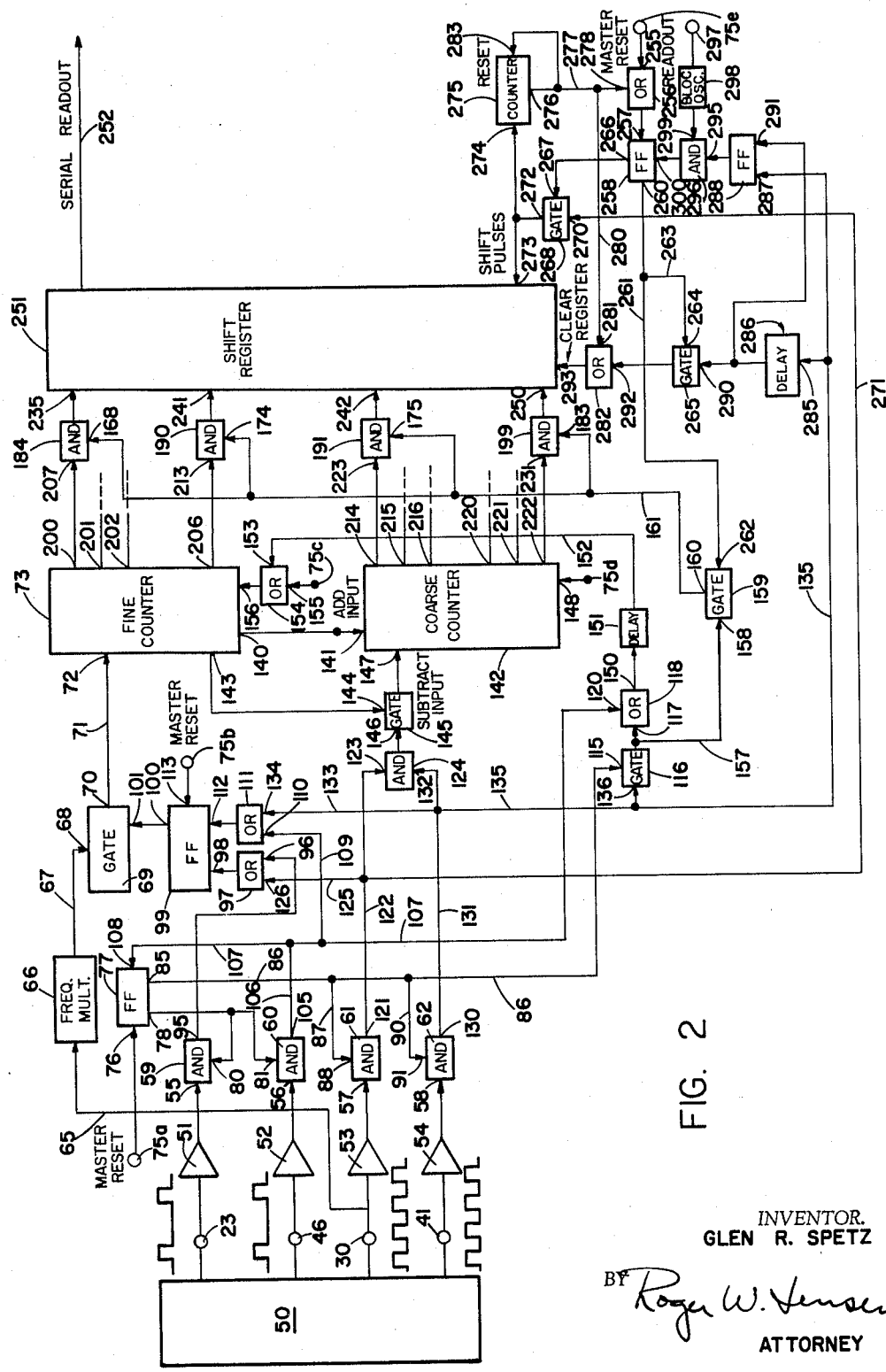

These and other objects of my invention will become apparent to those skilled in the art upon consideration of the accompanying specification, claims and drawings of which:

FIGURE 1 is a diagrammatic illustration of a magnetic drum and its associated pickup heads; and FIGURE 2 is a diagrammatic illustration of an embodiment of the invention.

Referring to FIGURE 1, there is shown a magnetic drum 10 coaxially mounted on a shaft 11 of a motor 12. Recorded on the surface of drum 10 are a plurality of "short" magnetic lines 13 and a "long" magnetic line 14. Lines 13 and 14 preferably are parallel to the axis of shaft 11.

A first pickup or sensing head 15 is mounted adjacent to the surface of the drum 10 and is positioned so as to be actuated by, or sense, only the "long" magnetic line 14. Sensing head 15 has a first terminal 16 connected by means of a conductor 17 to ground 20, and a second terminal 21 connected by means of a conductor 22 to an output terminal 23. A second stationary sensing head 24 is mounted adjacent to the surface of drum 10 and is positioned so as to be actuated by, or sense, all of the recorded magnetic lines on the surface of drum 10. Sensing head 24 has a first terminal 25 connected by means of a conductor 26 to ground 20 and a second terminal 27 connected by means of a conductor 28 to an output terminal 30.

A sensing head 31 and a sensing head 32 are mounted adjacent to the surface of magnetic drum 10 by means of an arm 33 connected to a shaft 34 and a support member 35, and are thereby provided with unlimited rotation relative to the surface of drum 10. Sensing heads 15 and 32 are a first condition responsive means and sensing heads 24 and 31 are a second condition responsive means.

Sensing head 31 is positioned so as to sense all of the recorded magnetic lines on the surface of drum 10, while sensing head 32 is positioned so as to sense only the "long" magnetic line 14.

A first terminal 36 of sensing head 31 is connected to ground 20 by means of a conductor 37 while a second terminal 38 of sensing head 31 is connected by means of a conductor 40 to an output terminal 41.

A first terminal 42 of sensing head 32 is connected to ground 20 by means of a conductor 43 while a second terminal 44 of sensing head 32 is connected by means of a conductor 45 to an output terminal 46.

Referring to FIGURE 2, drum 10 and its associated circuitry are shown as a condition responsive means 50. Output terminals 23, 46, 30 and 41 of condition responsive means 50 are connected by means of a plurality of amplifiers 51, 52, 53 and 54, respectively, to first input terminals 55, 56, 57 and 58 of a plurality of AND gates 59, 60, 61 and 62, respectively.

Output terminal 30 of condition responsive device 50 is also connected by means of a conductor 65 to the input of a frequency multiplier 66. The output of frequency multiplier 66 is connected by means of a conductor 67 to the input terminal 68 and a gate circuit 69. An output 70 of gate circuit 69 is connected by means of a conductor 71 to an input terminal 72 of a "fine" counter 73.

A master reset 75a is connected to a first input terminal 76 of a flip flop 77. A first output 78 of flip flop 77 is connected to a second input 80 and 81 of AND gates 59 and 60 respectively. A second output 85 of flip flop 77 is connected by means of a conductor 86 and a conductor 87 to a second input 88 of AND gate 61, and by means of conductor 86 and a conductor 90 to a second input 91 of AND gate 62.

An output 95 of AND gate 59 is connected to a first input 96 of an OR gate 97. The output of OR gate 97 is connected to an input 98 of a flip flop 99. An output 100 of flip flop 99 is connected to a control input 101 of gate circuit 69.

An output 105 of AND gate 60 is connected by means of a conductor 106 and a conductor 107 to a second input 108 of flip flop 77, and by means of conductors 106, 107 and a conductor 109 to an input 110 of an OR gate 111. The output of OR gate 111 is connected to a second input 112 of flip flop 99. A master reset 75b is connected to a third input 113 of flip flop 99.

Output 85 of flip flop 77 is connected by means of conductor 86 to an input 115 of a gate circuit 116. The output of gate 116 is connected to the input 117 of an OR gate 118. The output 105 of AND gate 60 is connected by means of conductor 107 to a second input 120 of OR gate 118.

An output 121 of AND gate 61 is connected by means of a conductor 122 to a first input 123 of an AND gate 124, and by means of conductor 122 and a conductor 125 to a second input 126 of OR gate 97. An output 130 of AND gate 62 is connected by means of a conductor 131 to a second input 132 of AND gate 124, and by means of a conductor 133 to a second input 134 of OR gate 111. Output 130 of AND gate 62 is further connected by means of conductor 131 and a conductor 135 to a second input 136 of gate circuit 116.

An overflow output terminal 140 of fine counter 73 is connected to the ADD input 141 of a coarse counter 142. An output 143 of fine counter 73 is connected to a first input 144 of a gate circuit 145. The output of AND gate 124 is connected to a second input 146 of gate 145. The output of gate 145 is connected to a SUBTRACT input 147 of coarse counter 142.

A master reset input 75d is connected to a reset input 148 of counter 142.

An output 150 of OR gate 118 is connected to the input of a delay element 151. The output of delay element 151 is connected by means of a conductor 152 to a first input 153 of an OR gate 154. A master reset 75c is connected to a second input terminal 155 of OR gate 154. The output of OR gate 154 is connected to the reset input 156 of the fine counter 73.

The output of gate 116 is further connected by means of a conductor 157 to a first input 158 of a gate circuit 159. The output 160 of gate 159 is connected by means of a conductor 161 to first input terminals 168–183 of AND gates 184–199, respectively. Transfer outputs 200–206 of fine counter 73 are connected to second inputs 207–213 of AND gates 184–190 respectively.

Transfer outputs 214–222 of coarse counter 142 are connected to second inputs 223–231 of AND gates 191–199 respectively. The outputs of AND gates 184–199 are connected to input terminals 235–250 respectively of a shift register 251. Shift register 251 has a serial readout line 252.

A master reset switch 75e is connected to a first input 255 of an OR gate 256. The output of OR gate 256 is connected to a first input 257 of a flip flop 258. A first output 260 of flip flop 258 is connected by means of a conductor 261 to a second input 262 of gate circuit 159, and by means of conductor 261 and a conductor 263 to a first input 264 of a gate circuit 265.

A second output 266 of flip flop 258 is connected to a first input 267 of a gate circuit 268. A second input 270 of gate circuit 268 is connected by means of a conductor 271 and conductor 122 to the output 121 of AND gate 61.

An output 272 of gate circuit 268 is connected to a shift pulses input 273 of shift register 251, and to an input 274 of a counter 275. An output 276 of counter 275 is connected by means of a conductor 277 to a second input 278 of OR gate 256, and by means of conductor 277 and a conductor 280 to a first input 281 of an OR gate 282. Output 276 of counter 275 is further connected to a reset input 283 of counter 275.

Output 130 of AND gate 62 is connected by means of conductor 131 and conductor 135 to an input 285 of a delay circuit 286, and to a first input 287 of a flip flop 288. The output of delay circuit 286 is connected to a second input 290 of gate circuit 265 and to a second input 291 of flip flop 288. The output of gate circuit 265 is connected to a second input 292 of OR gate 282.

The output of OR gate 282 is connected to a clear register input 293 of shift register 251.

The output of flip flop 288 is connected to a first input 295 of an AND gate 296. A readout button 297 is connected to the input of a blocking oscillator 298. The output of blocking oscillator 298 is connected to a second input 299 of AND gate 296. The output of AND gate 296 is connected to a second input 300 of flip flop 258.

*Operation*

In considering the specific operation of this invention assume that drum 10 of FIGURE 1 is rotating in a counter-clockwise direction at 25 revolutions per second. Assume further that there are 359 "short" magnetic lines 13 and one "long" magnetic line 14 recorded on the surface of drum 10, the 360 magnetic lines being spaced one degree apart. It should be understood that more or less magnetic lines could be used if desired, and that the invention is not to be limited to the use of 360, nor is the drum speed limited to 25 revolutions per second.

Stationary sensing head 15 and movable sensing head 32 are positioned adjacent to the surface of drum 10 so that a pulse is induced in these heads by the "long" magnetic line only, while stationary sensing head 24 and movable sensing head 31 are positioned adjacent to the surface of drum 10 so that a pulse is induced in these heads by all of the 360 magnetic lines. Therefore, one pulse will be induced in heads 15 and 32 during each drum revolution while 360 pulses will be induced in heads 24 and 31 during each drum revolution.

The wave forms induced in heads 15, 24, 31 and 32 are shown at their respective outputs 23, 30, 41 and 46.

Referring to FIGURE 2 it can be seen that the pulses appearing at output 30 of condition responsive device 50 are fed through conductor 65 to a frequency multiplier 66. Frequency multiplier 66 produces a pulse output at a frequency of 1.08 megacycles per second. This output is fed by means of conductor 67 to the input 68 of gate circuit 69.

Assume that master reset switch 75 (not shown) has been actuated and that pulses appear on the various master reset inputs 75a–75e. The pulse at master reset input 75a is coupled to the input 76 of flip flop 77 and sets flip flop 77 so that a "1" appears at flip flop output 78 and a "0" appears at flip flop output 85. The "1" at the output 78 of flip flop 77 is coupled to the inputs 80 and 81 of AND gates 59 and 60 respectively and enables these gates. The "0" at output 85 of flip flop 77 is coupled through conductor 86 to the input 115 of gate 116, through conductors 86 and 87 to the input 88 of AND gate 61, and through conductors 86 and 90 to the input 91 of AND gate 62 thereby inhibiting gates 61, 62 and 116.

The pulse on master reset 75b is coupled to the input 113 of flip flop 99 and sets this flip flop such that a zero appears on the output 100 of flip flop 99 and is coupled to input 101 of gate 69 thereby inhibiting this gate circuit.

The master reset input at terminal 75c is coupled through OR gate 154 to the input 156 of the fine counter 73 and clears this counter to zero, while the master reset pulse at terminal 75d is coupled to the input 148 of coarse counter 142 and clears counter 142 to zero.

The master reset pulse appearing at master reset input 75e is coupled through OR gate 256 to the input 257 of flip flop 258 and sets flip flop 258 so that a "0" appears at flip flop output 266 and a "1" appears at flip flop output 260. The "0" at output 266 of flip flop 258 is coupled to the input 267 of gate 268 and inhibits gate 268. The "1" appearing at output 260 of flip flop 258 is coupled by means of conductor 261 to the input 262 of gate 159 and enables gate 159, and by means of conductor 261 and conductor 263 to the input 264 of gate 265 enabling gate 265.

The encoder of this invention utilizes two cycles of operation, the start cycle and the running cycle. During the start cycle the initial condition or angle between the fixed pickup heads and the rotation pickup heads is measured, while during the running cycles incremental changes in the condition or angle between the fixed pickup heads and the rotating pickup heads are measured. The operation of the start cycle and the running cycle will now be explained more fully.

When the master reset switch has been activated as explained above the circuit is in condition for the beginning of the start cycle. Since, as explained above, AND gates 61 and 62 are inhibited only pulses induced in fixed sensing head 15 and movable sensing head 32 will have any effect on circuit operation during the start cycle.

When the "long" magnetic line 14 passes under fixed sensing head 15 a pulse is induced in this sensing head and is coupled by means of conductor 22, terminal 23, amplifier 51, enabled AND gate 59, and OR gate 97 to the input 98 of flip flop 99. The pulse appearing on input 98 of flip flop 99 sets flip flop 99 so that a "1" appears at flip flop output 100 and is coupled to input 101 of gate 69 thereby enabling gate 69. When gate 69 is enabled the 1.08 megacycle pulse output of frequency multiplier 66 is coupled through conductor 67, input 68 to output 70 of gate 69 and conductor 71 to the input 72 of fine counter 73.

Fine counter 73 is a 120-count counter and each time the count in counter 73 reaches 120, a pulse appears at output 140 of counter 73 and is coupled to the input 141 of coarse counter 142 and is counted in counter 142. Coarse counter 142 is a 360-count counter.

It can be readily seen that since drum 10 is rotating at 25 revolutions per second it will take .04 second for the drum to complete one revolution. Furthermore, since when gate 69 is enabled the pulse frequency to the fine counter 73 is 1.08 megacycles, the number of pulses to counter 73 in one revolution of drum 10 will be 43,200 pulses per revolution, which means that the number of pulses per degree of drum revolution will be 120. Therefore it can be seen that the pulse count in fine counter 73 represents fractions of degrees while the pulse count in coarse counter 142 represents degrees.

When magnetic drum 10 rotates so that the "long" magnetic line 14 passes under the rotatable sensing head 32 a pulse is induced in head 32 and is coupled through conductor 45, terminal 46 and amplifier 52 to the input 56 of AND gate 60. Since AND gate 60 is enabled by the "1" output of flip flop 77 the pulse from sensing head 32 appears at the output 105 of AND gate 60. The pulse at the output 105 of AND gate 60 is coupled through conductor 106, conductor 107, conductor 109 and OR gate 111 to the input 112 of flip flop 99. The pulse at input 112 sets flip flop 99 so that a "0" appears at the output 100 of flip flop 99 and is coupled to the input 101 of gate circuit 69 thereby inhibiting the gate. Since gate 69 is now inhibited the pulses from the output of frequency multiplier 66 are no longer fed to fine counter 73 and the pulse count stored in coarse counter 142 and fine counter 73 represents the angle between the stationary sensing heads and the rotatable sensing heads.

The output of AND gate 60 is also coupled through conductor 106, conductor 107 and the input 120 of OR gate 118 to the output 150 or OR gate 118.

The pulse at the output 150 of OR gate 118 is coupled through delay element 151, a conductor 152 and the OR gate 154 to the input 156 of fine counter 73 and clears the fine counter to zero. The delay element 151 delays the output or OR gate 118 long enough so that the pulse count in the fine counter 73 and the coarse counter 142 can be transferred to the shift register 251, as will be explained herein below.

It will be noted that while the fine counter 73 is returned to zero the pulse count in the coarse counter 142 is not shifted to zero and that this count represents the angle between the stationary sensing heads and the rotatable sensing heads to the nearest degree.

The output of AND gate 60 is further connected by means of conductor 106 and conductor 107 to the input 108 of flip flop 77. The pulse at the input 108 of flip flop 77 sets the flip flop so that a "0" appears at flip flop output 78 and a "1" output appears at output 85. The "0" at output 78 is coupled to the inputs 80 and 81 of AND gates 59 and 60 respectively thereby inhibiting these AND gates, while the "1" at the output 85 of flip flop 77 is coupled by means of conductor 86 and conductor 87 to the input 88 of AND gate 61, and by means of conductor 86 and conductor 90 to the input 91 of AND gate 62. The "1" at the inputs 88 and 91 of AND gates 61 and 62 respectively enable these AND gates. The inhibiting of AND gates 59 and 60 and the enabling of AND gates 61 and 62 marks the end of the start cycle and the beginning of the running cycle. The one output 85 of flip flop 77 is further connected by means of conductor 86 to the input terminal 115 of gate 116 thereby enabling gate 116.

When any of the magnetic lines recorded on the surface of drum 10 pass under the fixed sensing head 24 a pulse will be induced in sensing head 24 and will be coupled through conductor 28, terminal 30 and amplifier 53 to the input 57 of AND gate 61. Since AND gate 61 is enabled by the "1" output of flip flop 77, the pulse at the input 57 of AND gate 61 will be coupled to the output 121 and will be coupled by means of conductor 122, conductor 125 and OR gate 97 to the input 98 of flip flop 99. The pulse at the input 98 of the flip flop 99 sets flip flop 99 so that a "1" appears at flip flop output 100 and is coupled to the input 101 of gate 69 thereby enabling gate 69. As explained previously, when 69 is enabled the pulse output of frequency multiplier 66 is coupled through conductor 67, gate 69 and conductor 71 to the input 72 of the fine counter 73.

When the next magnetic pulse on the surface of drum 10 passes under sensing head 31 a pulse will be induced in head 31 and will be coupled through conductor 40, terminal 41 and amplifier 54 to the input 58 of AND gate 62. Since AND gate 62 is enabled by the "1" at the output 85 of flip flop 77, the pulse at the input 58 of AND gate 62 will be coupled to the gate output 130 and will be coupled through conductor 131, conductor 133 and OR gate 111 to the input 112 of flip flop 99. The pulse at input 112 of flip flop 99 sets the flip flop so that a "0" appears at flip flop output 100 and is coupled to the input 101 of gate 69 thereby inhibiting the gate. The pulse count in the fine counter 73 is indicative of the fractional change in one degree of arc between the fixed sensing heads and the rotatable sensing heads. The pulse at the output 130 of AND gate 62 is further connected by means of conductor 131 and conductor 135 to the input 136 of gate circuit 116. Gate 116 is enabled by the "1" at the output 85 of flip flop 77 and therefore the pulse at the input 136 of gate 116 is coupled through the gate and appears at the gate output. The pulse at the output of gate 116 is coupled through conductor 157 to the input 158 of gate 159. Since gate 159 is enabled by means of the "1" output of flip flop 258, the pulse at the input 158 of gate 159 appears at the gate output 160 and is coupled through conductor 161 to the inputs 168–174 of AND gates 184–190 and to the inputs 175–183 of AND gates 191–199 respectively and enables these AND gates.

The pulse count in fine counter 73 appears at the transfer outputs 200–206 and is coupled to the inputs 207–213 of AND gates 184–190 respectively therefore, when the pulse from the output 160 of gate 159 enables AND gates 184–190 the pulse count of fine counter 73 is transferred through AND gates 184–190 to the inputs 235–241 of shift register 251 and is stored in the shift register. Similarly, the pulse count stored in the coarse counter 142 appears at the transfer outputs 214–222 and is coupled to the inputs 223–231 of AND gates 191–199. As in the case of the fine counter when the pulse ouput of gate 159 enables AND gates 191–199 the pulse count in the coarse counter 142 is transferred through AND gates 191–199 to the inputs 242–250 of shift register 251 and is stored in the shift register. At this time the initial angle between the stationary sensing heads and the rotatable sensing head is stored in both the coarse and fine counters and in the shift register. The pulse at the output 150 of OR gate 118 is connected by means of delay element 151, conductor 152 and OR gate 154 to the input 156 of fine counter 73. As explained before, the pulse at input 156 of fine counter 73 clears the counter to zero.

It should be noted that each time a magnetic line passes beneath the fixed sensing head 24 a pulse will be induced in this sensing head which will be coupled to gate 69 thereby enabling gate 69 and allowing the puse output of frequency multiplier 66 to be counted in the fine counter 73. Also, when a magnetic line passes under sensing head 31 a pulse will be induced in this head and will be coupled to gate 69 thereby inhibiting gate 69 and preventing the pulse output of frequency multiplier 66 from being counted in the fine counter 73. It should be further noted that since the magnetic lines on the surface of drum 10 are spaced one degree apart the maximum number of pulses that can be counted in the fine counter 73 during the time that a pulse is induced in sensing head 24 and the time that a pulse in induecd in sensing head 31 is 120.

As explained hereinbefore the coarse counter 142, which contains the count to the nearest degree, is never reset. Once the initial coarse angle is stored during the start cycle, it will remain until a master reset pulse is applied to master reset input 75d. The coarse angle, however, may be increased or decreased as determined by the ADD input 141 or the SUBTRACT input 147. If the fine counter 73 counts to 120, corresponding to an angle of one degree, an ADD pulse will occur at the output 140 of fine counter 73 and will be coupled to the ADD input 141 of coarse counter 142 and will increase the count in the coarse counter by one. If, however, the count in the fine counter 73 is reducing to zero, a SUBTRACT pulse must occur, which indicates that the angle has decreased by one degree. It will be noted that in both instances explained above, that is, when the fine counter counts 120 or when the fine counter counts zero the pulses induced in the stationary sensing head 24 and the rotatable sensing head 31 will be coincident. The pulse appearing at output 121 of AND gate 61 is coupled by means of conductor 122 to the input 123 of AND gate 124, while the pulse appearing at the output 130 of AND gate 62 is coupled by means of conductor 131 to the input 132 of AND gate 124. Since the pulses to the inputs 123 and 132 of AND gate 124 are coincident a pulse will appear at the output of AND gate 124 and will be coupled to the input 146 of gate 145. If the angle has increased by one degree, the 119th count in the fine counter 73 will produce an output at terminal 143 of fine counter 73 which will be coupled to the input 144 of gate 145 thereby inhibiting gate 145. Since gate 145 is inhibited the output of AND gate 124 appearing at input 146 of gate 145 will be blocked and there will be no pulse applied to the SUBTRACT input 147 of the coarse counter 142. If, however, the angle has decreased by one degree then the count in the fine counter 73 will go to zero and no inhibit pulse will appear at terminal 143 of the fine counter 73 and hence gate 145 will be enabled and therefore the output of AND gate 124 appearing at input 146 of gate 145 will be coupled through the gate to the SUBTRACT input 147 of the coarse counter 142 and one count will be subtracted from the coarse counter.

As explained above, a new count is stored in the shift register 251 each time a pulse is induced in rotatable sensing head 31. This count can be shifted out of the register by operation of the readout button 297, at any time up to the occurrence of the next pulse inducted in sensing head 31.

The pulses induced in rotatable sensing head 31 are coupled through amplifier 54, AND gate 62, conductor 131, and conductor 135 to the input 285 of delay circuit 286, and to the input 287 of flip flop 288. The pulse at the input 287 of flip flip 288 produces a "1" output at the flip flop which is coupled to the input 295 of AND gate 296 thereby enabling AND gate 296.

After a suitable delay, the pulse applied to input 285 of delay circuit 286 will appear at the output of delay 286 and will be coupled to the input 290 of gate circuit 265. If the readout button has not been pushed the pulse at the input 290 will be coupled through gate 265 and through OR gate 282 to the input 293 of shift register 251 thereby clearing register 251. The output of delay circuit 286 will also be coupled to the input 291 of flip flop 288 resetting the flip flop so that a zero appears at the flip flop output and is coupled to the input 295 of AND gate 296 thereby inhibiting gate 296.

However, if the readout button is pushed before the pulse appears at the output of delay circuit 286, then blocking oscillator 298 will produce a pulse at its output which will be coupled to the input 299 of AND gate 296. Since AND gate 296 is enabled by the output of flip flop 288 the pulse from the blocking oscillator will be coupled through AND gate 296 to the input 309 of flip flop 258 and will set flip flop 258 such that a "1" appears at its output 266 and a "0" appears at its output 260. The "0" at output 260 of flip flop 258 is coupled by means of conductor 261 to the input 262 of gate circuit 159 and inhibits gate 159, and by means of conductors 261 and 263 to the input 264 of gate 265 thereby inhibiting gate 265. Since gate 265 is inhibited the output from delay element 286 will be blocked and hence there will be no output from gate 265 and the shift register 251 will not be cleared. Similarly, since gate 159 is inhibited the output of gate 116 will be blocked thereby preventing AND gates 168 through 183 from being enabled and preventing a transfer of new information into the shift register 251.

Since gate 268 is enabled by the output of flip flop 258, the pulses induced in the stationary sensing head 24 will be coupled through conductor 28, terminal 30, amplifier 53, AND gate 61, conductor 122, conductor 271 and gate 268 to the shift pulses input 273 of the shift register 251 and will serially shift the information out of shift register 251. The output of shift register 251 will appear on the serial readout line 252. The output of gate 268 is also coupled to the input 274 of counter 275. Counter 275 is a 16-bit counter and when the sixteenth pulse has been counted in the counter an output will appear at terminal 276 of counter 275. This pulse will be coupled to the reset input 283 of counter 275 thereby resetting the counter, and by means of conductor 277 to the input 278 of OR gate 256. The pulse at the input 278 of OR gate 256 is coupled through the OR gate and is applied to the input 257 of flip flop 258 thereby setting flipflop 258 such that a "0" appears at its output 266 and a "1" appears at its output 260. The "0" at output 266 of flip flop 258 is coupled to the input 267 of gate 268 thereby inhibiting this gate and preventing any further pulses from being applied to the shift pulse input 273 of shift register 251. The "1" output appearing at terminal 260 of flip flop 258 is coupled by means of conductor 261 to the input 262 of gate 159 and enables gate 159, and by means of conductors 261 and 263 to the input 264 of gate 265 thereby enabling gate 265. The output from counter 275 is further connected by means of conductor 277 and conductor 280 to the input 281 of OR gate 282. The pulse at the input 281 of OR gate 282 produces a pulse output of the OR gate which is coupled to the clear register input 293 of shift register 251 thereby clearing the register.

It is to be understood that while I have shown a specific embodiment of my invention that this is for the purpose of illustration only, and that this invention is limited solely by the scope of the appended claims.

I claim as my invention:

1. Apparatus comprising: a drum rotatable about an axis and having a signal track thereon; first and second signal responsive means mounted in a fixed relationship to said signal track whereby said first signal responsive means delivers a signal when a specific portion of said track is in proximity thereto and said second signal responsive means delivers a signal when any of a plurality of portions of said track are in proximity thereto; third and fourth signal responsive means rotatably mounted around said axis in proximity to said signal track and movable with respect to said first and second signal responsive means whereby said third signal responsive means delivers a signal when said specific portion of said track is in proximity thereto and said fourth signal responsive means delivers a signal when any of said plurality of said portions of said track are in proximity thereto; pulse generating means; gate means; means connecting said gate means to an output of said pulse generating means; means connecting said first, second, third and fourth signal responsive means to said gate means for opening said gate means in response to a signal from said first or second signal responsive means and closing said gate means in response to a signal from said third or fourth signal responsive means; pulse counting means connected to said gate means for counting the pulses therefrom; and storage means connected to said counting means for storing a pulse count from said gate means between signals from said first and third signal responsive means and for algebraically summing with said pulse count a further pulse count from said gate means between signals from said second and fourth signal responsive means.

2. Apparatus comprising: a magnetic drum rotatable about an axis and having a plurality of magnetic lines recorded upon the surface thereof; first and second stationary pickup means positioned adjacent to said drum so that only one of said magnetic lines activates said stationary pickup means and all of said magnetic lines activate said second stationary pickup means; first and second movable pickup means rotatably mounted with respect to the surface of said magnetic drum and positioned adjacent to the surface of said drum so that only said one of said magnetic lines activates said first movable pickup means and all of said magnetic lines activate said second movable pickup means; oscillator means; gate means; means connecting said oscillator means to an input of said gate means; counting means connected to an output of said gate means; means connecting said first stationary pickup means and said first movable pickup means to said gate means whereby activation of said first stationary pickup means by said one magnetic line opens said gate means and allows said counting means to count the output of said oscillator means, and activation of said first movable pickup means by said one magnetic line inhibits said gate means and prevents said counting means from counting the output of said oscillator means, the total count in said counting means being indicative of the total angle between said first stationary pickup means and said first movable pickup means; and means connecting said second stationary pickup means and said second movable pickup means to said gate means whereby activation of said second stationary pickup means by any of said magnetic lines opens said gate means and activation of said second movable pickup means by any of said magnetic lines inhibits said gate means, the count counted in said counting means under the control of said second pickup means being indicative of incremental changes in the total angle between the stationary and movable pickup means.

3. Apparatus comprising: a signal drum rotatable about an axis; first and second stationary signal responsive means positioned adjacent to said drum whereby said first stationary signal responsive means delivers a signal when a specific portion of said drum is in proximity thereto and said second stationary signal responsive means delivers a signal when any of a plurality of portions of said drum are in proximity thereto; first and second movable signal responsive means rotatably mounted with respect to the surface of said signal drum and positioned adjacent to the surface of said drum whereby said first movable signal responsive means delivers a signal when said specific portion of said drum is in proximity thereto and said second movable signal responsive means delivers a signal when any of said plurality of portions of said drum are in proximity thereto; pulse generating means; gate means; means connecting said gate means to an output of said pulse generating means; means connecting said first and second stationary signal responsive means and said first and second movable signal responsive means to said gate means for opening said gate means in response to a signal from said first or second stationary signal responsive means and closing said gate means in response to a signal from said first or second movable signal responsive means; pulse counting means connected to said gate means for counting the pulses therefrom; and storage means connected to said counting means for storing a pulse count from said gate means between signals from said first stationary and said first movable signal responsive means and for algebraically summing with said pulse count a further pulse count from said gate means between signals from said second stationary and said second movable signal responsive means.

4. Apparatus comprising: pulse generating means; gate means connected so as to receive pulses from said pulse generating means; first signal producing means of a particular frequency connected to said gate means so as to allow the passage of pulses therethrough; first delay means variable in response to a given condition connecting said first signal producing means to said gate means so as to inhibit the passage of pulses therethrough, a pulse count through said gate being indicative of said given condition; second signal producing means of a substantially higher frequency than said first signal producing means connected to said gate means so as to allow the passage of pulses therethrough; second delay means variable in response to said given condition connecting said second signal producing means to said gate means so as to inhibit the passage of pulses therethrough a pulse count through said gate being indicative of incremental changes in said given condition; counting means connected to said gate means for counting the pulses therethrough; and storage means connected to said counting means for storing the pulse count indicative of said given condition and correcting said pulse indicative of said given condition in response to the pulse count indicative of incremental changes in said given condition.

References Cited by the Examiner
UNITED STATES PATENTS

| 2,730,698 | 1/1956 | Daniels et al. | 340—347.3 |
| 2,775,755 | 12/1956 | Sink | 340—347.3 |
| 2,947,976 | 8/1960 | Mendelson et al. | 340—172.5 |

ROBERT C. BAILEY, *Primary Examiner.*

DARYL W. COOK, *Examiner.*

I. S. KAVRUKOV, *Assistant Examiner.*